United States Patent

[19]

Hugi et al.

[11] 3,917,623

[45] Nov. 4, 1975

[54] DIHYDRO-3-(-1-PHENETHYL)1,2,3,6-TETRAHYDRO-4-PYRIDYL)-2(3H) FURANONES

[75] Inventors: Bruno Hugi, Aesch; Gunter Rentsch, Munchenstein; Erwin Rissi, Basel, all of Switzerland

[73] Assignee: Sandoz Ltd., Basel, Switzerland

[22] Filed: Sept. 6, 1974

[21] Appl. No.: 503,969

[30] Foreign Application Priority Data

Sept. 11, 1973 Switzerland.................. 13023/73

[52] U.S. Cl........ 260/294.8 G; 260/295 R; 424/263
[51] Int. Cl.²............... C07D 405/06; A61K 31/44
[58] Field of Search.................. 260/295 R, 294.8 G

[56] References Cited
UNITED STATES PATENTS 3,740,406  6/1973  Ebnother et al.............. 424/267
3,740,407  6/1973  Ebnother et al.............. 424/267

*Primary Examiner*—Norman A. Drezin
*Attorney, Agent, or Firm*—Gerald D. Sharkin; Robert S. Honor

[57] ABSTRACT

The present invention concerns novel compounds of formula I,

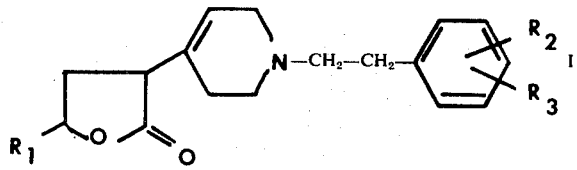

wherein
  $R_1$ is hydrogen or lower alkyl,
  $R_2$ is hydrogen, lower alkyl, lower alkoxy, lower alkylthio, fluorine, chlorine, bromine or trifluoromethyl, and
  $R_3$ is hydrogen, chlorine, lower alkyl or lower alkoxy,
useful as analgesics.

21 Claims, No Drawings

DIHYDRO-3-(-1-PHENETHYL)1,2,3,6-TETRAHYDRO-4-PYRIDYL)-2(3H) FURANONES

The present invention relates to new heterocyclic compounds.

In accordance with the invention there are provided new compounds of formula I,

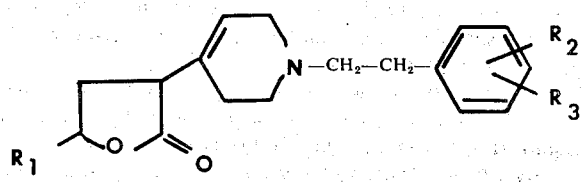

I wherein
$R_1$ is hydrogen or lower alkyl,
$R_2$ is hydrogen, lower alkyl, lower alkoxy, lower alkylthio, fluorine, chlorine, bromine or trifluoromethyl, and
$R_3$ is hydrogen, chlorine, lower alkyl or lower alkoxy.

Further, in accordance with the invention a compound of formula I may be obtained by a process comprising removing water from a compound of formula II,

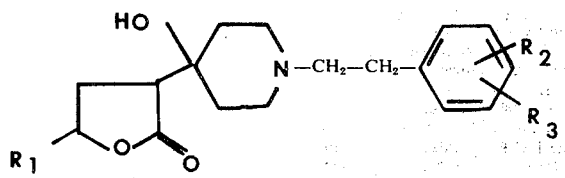

II wherein $R_1$, $R_2$ and $R_3$ are as defined above.

The substituent $R_1$ in the compounds of formula I preferably signifies hydrogen. When $R_1$ is lower alkyl, this alkyl group preferably contains one to four carbon atoms and especially signifies methyl. The substituents $R_2$ and $R_3$ preferably signify hydrogen or chlorine. When the substituents $R_2$ and $R_3$ contain lower alkyl groups, these groups preferably contain one to four carbon atoms and especially signify methoxy, methyl or methylthio. One of the substituents $R_2$ or $R_3$ is preferably present in an o position.

The preferred compounds of formula I are, for example, those wherein $R_1$ is hydrogen, $R_2$ is chlorine preferably in an o position, and $R_3$ is hydrogen or chlorine.

The removal of water from a compound of formula II in accordance with the invention may be effected by treating a compound of formula II with a strong, highly concentrated, optionally aqueous acid or a mixture of a strong acid and phosphorus pentoxide. It is preferred to use a highly concentrated, strong mineral acid, especially high-percentage, preferably at least 70% sulphuric acid, or alternatively, highly concentrated hydrobromic acid or approx. 100 % phosphoric acid. Mixtures of phosphorus pentoxide and strong organic acid may also be conveniently used. Examples of strong organic acids which may be used are sulphonic acids, such as, for example, methanesulphonic acid. The necessary reaction temperature is between 0° and 130°C and is dependent on the strength and concentration of the acid used. For example, when sulphuric acid and a concentration of at least about 80 %, or a mixture of methanesulphonic acid and phosphorus pentoxide are used, then temperatures below 30° are generally sufficient. When weaker or more dilute acids are used, it may be necessary to use higher temperatures. An inert organic solvent, e.g. an optionally halogenated hydrocarbon or organic acid, e.g. glacial acetic acid, may optionally be added. The reaction time is dependent on the strength and concentration of the acid used and on the reaction temperature used and may, for example, be between 1 and 24 hours. The reaction conditions must naturally be chosen such that chemical side reactions of the water-removing agents with the compounds of formula II (e.g. sulphonation of phenyl rings activated by substitution upon using e.g. sulphuric acid, or ether splittings on phenyl rings substituted by lower alkoxy upon using e.g. hydrobromic acid) are avoided.

The reaction conditions are preferably chosen such that the reaction temperature is between 0° and 40°C, especially between 10° and 25°C. Especially convenient is the reaction with concentrated sulphuric acid or with a mixture of methanesulphonic acid and phosphorus pentoxide at a temperature between about 10° and 20°C.

The compounds of formula I may be isolated from the reaction mixture and purified in known manner. The free base forms may be converted into acid addition salt forms in the usual manner and vice versa. A suitable acid for salt formation is hydrochloric acid.

The starting materials of formula II are in general known.

In the following non-limitative Examples all temperatures are indicated in degrees Centigrade.

EXAMPLE 1

Dihydro-3-(1,2,3,6-tetrahydro-1-phenethyl-4-pyridyl)-2(3H)-furanone 20 g of dihydro-3-(4-hydroxy-1-phenethyl-4-piperidyl)-2(3H)-furanone are added portionwise to 50 cc of concentrated sulphuric acid while stirring and cooling, whereby the temperature of the reaction mixture should not rise over 20°. The mixture is subsequently allowed to react at 20° for 3 hours, is poured on ice, and potassium carbonate is added at a temperature of at most 10° until an alkaline reaction is obtained. Extraction is effected with chloroform, the dried extracts are concentrated by evaporation at reduced pressure and the resulting crude title compound is dissolved in ethanol. The calculated amount of hydrochloric acid in ethanol is added to a solution of the crude base in ethanol for conversion into the hydrochloride. After adding ether, the product is allowed to crystallize and the resulting crystalline product is purified by recrystallization from ethanol. The hydrochloride form of the title compound has a M.P. of 202°–203° (decomp.). (An Example of the pure, crystalline form.)

EXAMPLE 2

3-(1-o-chlorophenethyl-1,2,3,6-tetrahydro-4-pyridyl)-dihydro-2(3H)-furanone

The title compound is obtained in accordance with the process described in Example 1, from 7.5 g of 3-(1-o-chlorophenethyl-4-hydroxy-4-piperidyl)dihydro-2(3H)-furanone hydrochloride and 35 cc of concentrated sulphuric acid, reaction time 17 hours at 20°. The title compound is converted into its hydrochloride form, M.P. 202°–204° (from ethanol). (An Example of the pure crystalline form.)

The following (3-phenethyl-1,2,3,6-tetrahydro-4-piperidyl)-dihydro-2(3H)-furanone derivatives may also be produced in a manner analogous to that descriged in Example 2, by removal of water from the corresponding (3-phenethyl-4-hydroxy-4-piperidyl)-dihydro-2(3H)-furanone derivatives:

EXAMPLE 14

Dihydro-3-(1,2,3,6-tetrahydro-1-o-methoxyphenethyl-4-pyridyl)-2(3H)-furanone 4 g of dihydro-3-(4-hydroxy-1-o-methoxyphenethyl-4-piperidyl)-2(3H)-furanone are allowed to react at 40° in a mixture of 30 cc of methanesulphonic acid and 6 g of phosphorus pentoxide for 17 hours and working up is effected in a manner analogous to that described in Example 13 to obtain the hydrochloride form of the title compound.

The compounds of formula I are useful as analgesic agents for the treatment of pain as indicated in standard tests, for example, in the tail flick test in mice on s.c. administration of form 1 to 20 mg/kg animal body weight of the compounds and by an inhibition of the phenylbenzoquinone syndrome in mice on p.o. administration of from 15 to 30 mg/kg animal body weight of the compounds.

For this use the dosage will, of course, vary depending on the compound employed, mode of administration and treatment desired. However, in general, satis-

| Ex. No. | Compound | Remarks, physical constants |
| --- | --- | --- |
| 3 | 3-[1-(2,4-dichlorophenethyl)-1,2,3,6-tetrahydro-4-pyridyl]-dihydro-2(3H)-furanone | M.P. of the hydrochloride: 201–203° (from isopropanol) |
| 4 | 3-(1-p-fluorophenethyl-1,2,3,6-tetrahydro-4-pyridyl)-dihydro-2(3H)-furanone | M.P. of the hydrochloride: 180–182° (from isopropanol) |
| 5 | 3-(1-p-bromophenethyl-1,2,3,6-tetrahydro-4-pyridyl)-dihydro-2(3H)-furanone | M.P. of the hydrochloride: 202–204° (from acetone) |
| 6 | 3-(1-m-chlorophenethyl-1,2,3,6-tetrahydro-4-pyridyl)-dihydro-2(3H)-furanone | M.P. of the hydrochloride: 175–177° (from isopropanol) |
| 7 | 3-(1-p-chlorophenethyl-1,2,3,6-tetrahydro-4-pyridyl)-dihydro-2(3H)-furanone | M.P. of the hydrochloride: 198–200° (from acetone) |
| 8 | dihydro-3-(1,2,3,6-tetrahydro-1-m-trifluoromethylphenethyl-4-pyridyl)-2(3H)-furanone | M.P. of the hydrochloride: 165–168° (from isopropanol) |
| 9 | 3-[1-(2,6-dichlorophenethyl)-1,2,3,6-tetrahydro-4-pyridyl)]-dihydro-2(3H)-furanone | M.P. of the hydrochloride: 211–213° (from isopropanol) |
| 10 | 3-[1-(5-chloro-2-methoxyphenethyl)-1,2,3,6-tetrahydro-4-pyridyl]-dihydro-2(3H)-furanone | M.P. of the hydrochloride: 196–198° (from isopropanol) |
| 11 | dihydro-3-(1,2,3,6-tetrahydro-1-p-methylthiophenethyl-4-pyridyl)-2(3H)-furanone | |
| 12 | dihydro-3-(1-o-chlorophenethyl-1,2,3,6-tetrahydro-4-pyridyl)-2(3H)-5-methylfuranone | |

EXAMPLE 13

Dihydro-3-(1,2,3,6-tetrahydro-1-m-methylphenethyl-4-pyridyl)-2(3H)-furanone 4 g of dihydro-3-(4-hydroxy-1-m-methylphenethyl-4-piperidyl)-2(3H)-furanone are added portionwise, while stirring, to a mixture of 30 cc of methanesulphonic acid and 6 g of phosphorus pentoxide, whereby the temperature is kept between 20° and 25°. The mixture is subsequently allowed to react at 25° for 17 hours, is poured on ice and potassium carbonate is added at a temperature of 0°–10° until an alkaline reaction is obtained. Extraction is effected with methylene chloride, the dried phase is concentrated by evaporation at reduced pressure and the residue is dissolved in ethanol. Conversion into the hydrochloride form is effected by adding the calculated amount of hydrochloric acid in ethanol, crystallizing the hydrochloride form of the title compound with the addition of some ether and purifying the same by recrystallization. M.P. of the hydrochloride form of the title compound: 218°–221°.

factory results are obtained when administered at a daily dosage of from about 0,5 mg to about 30 mg per kg animal body weight, conveniently given in divided doses two to four times a day or in sustained release form. For the larger mammals, the total daily dosage is in the range from about 30 to about 300 mg, and dosage forms suitable for oral administration comprise from about 12 mg to about 250 mg of the compounds admixed with a solid or liquid pharmaceutical carrier or diluent.

The compounds of formula I may be administered in pharmaceutically acceptable acid addition salt form. Such acid addition salt forms exhibit the same order of activity as the free base forms and are readily prepared in conventional manner. Representative acid addition salt forms include organic acid salt forms such as the hydrogen maleate, fumarate, tartrate and methane sulphonate and mineral acid salt forms such as the hydrochloride, hydrobromide and sulphate. A pharmaceutical composition may comprise a compound of formula I, in free base form or in pharmaceutically acceptable acid addition salt form, in association with a pharmaceutical carrier or diluent. Such compositions conveniently contain more than 1 % by weight of the compound of formula I and may be prepared by conventional techniques to be in conventional forms, for example, capsules, tablets, suppositories, dispersible powders, syrups, elixirs, suspensions or solutions, for enteral or parenteral administration. Suitable pharmaceutical diluents or carriers include, for example, water, alcohols, natural or hardened oils and waxes, calcium and sodium carbonates, calcium phosphate, kaolin, talc and lactose as well as suitable preserving agents, such as ethyl-p-hydroxybenzoate, suspending agents such as methyl cellulose, tragacanth and sodium alginate, wetting agents such as lecithin, polyoxyethylene stearate and polyoxyethylene sorbitan mono-oleate, granulating and disintegrating agents such as starch and alginic acid, binding agents such as starch, gelatin and acacia, and lubricating agents such as magnesium stearate, stearic acid and talc, in order to provide an elegant and palatable pharmaceutical preparation. Compositions in tablet form may be coated by conventional techniques to delay disintegration of the tablet and absorption of the active ingredient in the gastro-intestinal tract and thereby provide sustained action over a long period.

The preferred compositions from the standpoint of ease of administration are solid compositions, particularly solid-filled gelatin capsules and tablets.

The Example 2 compound exhibits especially interesting properties. In a group of compounds $R_3$ is hydrogen.

We claim:

1. A compound of the formula

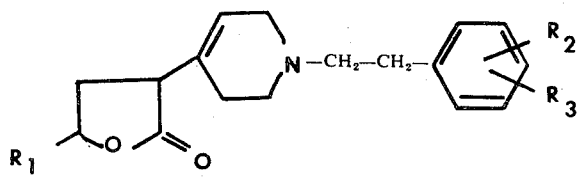

I wherein
  $R_1$ is hydrogen or lower alkyl,
  $R_2$ is hydrogen, lower alkyl, lower alkoxy, lower alkylthio, fluorine, chlorine, bromine or trifluoromethyl, and
  $R_3$ is hydrogen, chlorine, lower alkyl or lower alkoxy, or a pharmaceutically acceptable acid addition salt thereof.

2. A compound of claim 1 wherein $R_1$ is hydrogen.

3. A compound of claim 1 wherein $R_2$ and $R_3$ are independently hydrogen or chlorine.

4. A compound of claim 1 wherein one of $R_2$ and $R_3$ is present in the o position.

5. A compound of claim 1 wherein $R_3$ is hydrogen.

6. The compound of claim 1 which is dihydro-3-(1,2,3,6-tetrahydro-1-phenethyl-4-pyridyl)-2(3H)-furanone.

7. The compound of claim 1 which is 3-(1-o-chlorophenethyl-1,2,3,6-tetrahydro-4-pyridyl)-dihydro-2(3H)-furanone.

8. The compound of claim 1 which is 3-[1-(2,4-dichlorophenethyl)-1,2,3,6-tetrahydro-4-pyridyl]-dihydro-2(3H)-furanone.

9. The compound of claim 1 which is 3-(1-p-fluorophenethyl-1,2,3,6-tetrahydro-4-pyridyl)-dihydro-2(3H)-furanone.

10. The compound of claim 1 which is 3-(1-p-bromophenethyl-1,2,3,6-tetrahydro-4-pyridyl)-dihydro-2(3H)-furanone.

11. The compound of claim 1 which is 3-(1-m-chlorophenethyl-1,2,3,6-tetrahydro-4-pyridyl)-dihydro-2(3H)-furanone.

12. The compound of claim 1 which is 3-(1-p-chlorophenethyl-1,2,3,6-tetrahydro-4-pyridyl)-dihydro-2(3H)-furanone.

13. The compound of claim 1 which is dihydro-3-(1,2,3,6-tetrahydro-1-m-trifluoromethylphenethyl-4-pyridyl)-2(3H)-furanone.

14. The compound of claim 1 which is 3-[1-(2,6-dichlorophenethyl)-1,2,3,6-tetrahydro-4-pyridyl]-dihydro-2(3H)-furanone.

15. The compound of claim 1 which is 3-[1-(5-chloro-2-methoxyphenethyl)-1,2,3,6-tetrahydro-4-pyridyl]-dihydro-2(3H)-furanone.

16. The compound of claim 1 which is dihydro-3-(1,2,3,6-tetrahydro-1-p-methylthiophenethyl-4-pyridyl)-2(3H)-furanone.

17. The compound of claim 1 which is dihydro-3-(1-o-chlorophenethyl-1,2,3,6-tetrahydro-4-pyridyl)-2(3H)-5-methylfuranone.

18. The compound of claim 1 which is dihydro-3-(1,2,3,6-tetrahydro-1-m-methylphenethyl-4-pyridyl)-2(3H)-furanone.

19. The compound of claim 1 which is dihydro-3-(1,2,3,6-tetrahydro-1-o-methoxyphenethyl-4-pyridyl)-2(3H)-furanone.

20. The compound of claim 6 in crystalline form.

21. The compound of claim 7 in crystalline form.

* * * * *